United States Patent
DiMarzio, Jr.

(10) Patent No.: US 9,218,253 B2
(45) Date of Patent: Dec. 22, 2015

(54) EMBEDDED RESTORATION MEMORY

(71) Applicant: Hewlett-Packard Development Company, L.P., Houston, TX (US)

(72) Inventor: Anthony M. DiMarzio, Jr., Gilbertsville, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 13/905,455

(22) Filed: May 30, 2013

(65) Prior Publication Data
US 2014/0359352 A1 Dec. 4, 2014

(51) Int. Cl.
G06F 11/00 (2006.01)
G06F 11/14 (2006.01)
G06F 9/44 (2006.01)

(52) U.S. Cl.
CPC .......... *G06F 11/1469* (2013.01); *G06F 9/4406* (2013.01); *G06F 11/1417* (2013.01)

(58) Field of Classification Search
CPC . G06F 9/4401; G06F 9/4406; G06F 11/1417; G06F 11/1458; G06F 11/1469
See application file for complete search history.

(56) References Cited

U.S. PATENT DOCUMENTS

| | | | |
|---|---|---|---|
| 6,591,376 B1 * | 7/2003 | VanRooven et al. | 714/36 |
| 6,748,553 B2 * | 6/2004 | McBride et al. | 714/15 |
| 7,111,159 B2 | 9/2006 | Stein et al. | |
| 7,111,203 B2 * | 9/2006 | Hu et al. | 714/36 |
| 7,370,234 B2 * | 5/2008 | Stakutis et al. | 714/15 |
| 7,506,208 B2 | 3/2009 | Bang | |
| 8,069,343 B2 * | 11/2011 | Concorso | 713/1 |
| 8,732,527 B2 * | 5/2014 | Tabone et al. | 714/36 |
| 2006/0059327 A1 * | 3/2006 | Brown et al. | 713/1 |
| 2012/0311279 A1 | 12/2012 | Hong et al. | |

FOREIGN PATENT DOCUMENTS

EP 1469393 A1 * 10/2004
KR 20010070803 7/2001

OTHER PUBLICATIONS

Hard drive. Dictionary.com. The American Heritage® New Dictionary of Cultural Literacy, Third Edition. Houghton Mifflin Company, 2005. <<http://dictionary.reference.com/browse/hard drive>> (accessed: Feb. 27, 2015).*
<<https://web.archive.org/web/20130425022817/http://en.wikipedia.org/wiki/Script_(computing)>>; Apr. 2013; retrieved on Feb. 28, 2015.*
Narayanan, D. et al,; "Whole-system Persistence"; March 3-7, 2012; 10 pages.

* cited by examiner

*Primary Examiner* — Joseph Kudirka
(74) *Attorney, Agent, or Firm* — Hewlett-Packard Patent Department

(57) ABSTRACT

Example embodiments relate to embedded restoration memory. In one example implementation according to aspects of the present disclosure, a computing device may include a processor for executing instructions, a memory for storing instructions, a storage device having a user operating system, and a restoration memory embedded in the computing device and having a restoration module and a restoration image. The restoration operating system may exist independently of the user operating system and may be inaccessible to the user operating system. Additionally, the restoration module may cause the computing device to install the restoration image from the restoration memory onto the storage device upon the occurrence of a trigger event.

15 Claims, 3 Drawing Sheets

EMBEDDED RESTORATION MEMORY

BACKGROUND

From time to time, a user of a computing device may desire to restore the computing device to its original state by restoring a factory operating system to the computing device. For example, if a computing device becomes inoperable, a user may desire to restore the factory operating system in order to restore the computing device to a previously-working state (i.e., the original state as shipped from the factory).

BRIEF DESCRIPTION OF THE DRAWINGS

The following detailed description references the drawings, in which.

DETAILED DESCRIPTION

A user of a computing device may need to restore the computing device to a factory state if the computing device becomes inoperable or is otherwise not functioning properly. For example, if the hard disk drive of a personal computer crashes and is replaced, the user may desire to reinstall the factory operating system on a newly-installed replacement hard disk drive. To do so, the user must have an image of the factory operating system, for example, stored on a disk or USB memory device. However, more frequently, personal computers include a recovery partition on the hard disk drive instead of a physical disk or USB memory device. In this scenario, the user would be unable to restore the factory operating system. Moreover, in a computing device utilizing a recovery partition, the recovery partition may become damaged or corrupted by the operating system during normal operation such as by user action or a virus.

In another example, a user with a mobile device (e.g., a smart phone or cellular phone) that becomes inoperable may likewise need to restore the factory operating system to restore the mobile device to a working condition. In this situation, the user may rely on an operating system-based restore solution. However, if the mobile device becomes inoperable at a certain level (i.e., becomes a "brick" and the operating system will not load), then the user will have no restoration option. In other examples, other solutions may include disparate means such as the bundling of physical restoration media, separate system restore partitions, layered file system approaches, and design-specific implementations in which the computing devise is engineered around the requirement.

Various embodiments will be described below by referring to several examples of embedded restoration memory. A computing device may incorporate an embedded restoration memory to enable a user to restore the factory operating system on the computing device to restore functionality and return the computing device to a known state.

In one example, the embedded restoration memory alleviates the necessity for a physical media, such as a CD-ROM disk or other memory device, to be maintained and inserted into a computing device when restoration is required. In another example, the embedded restoration memory may be inaccessible to the user operating system, preventing the user operating system from corrupting or damaging the embedded restoration memory. These and other advantages will be apparent from the description that follows.

Figure 1:
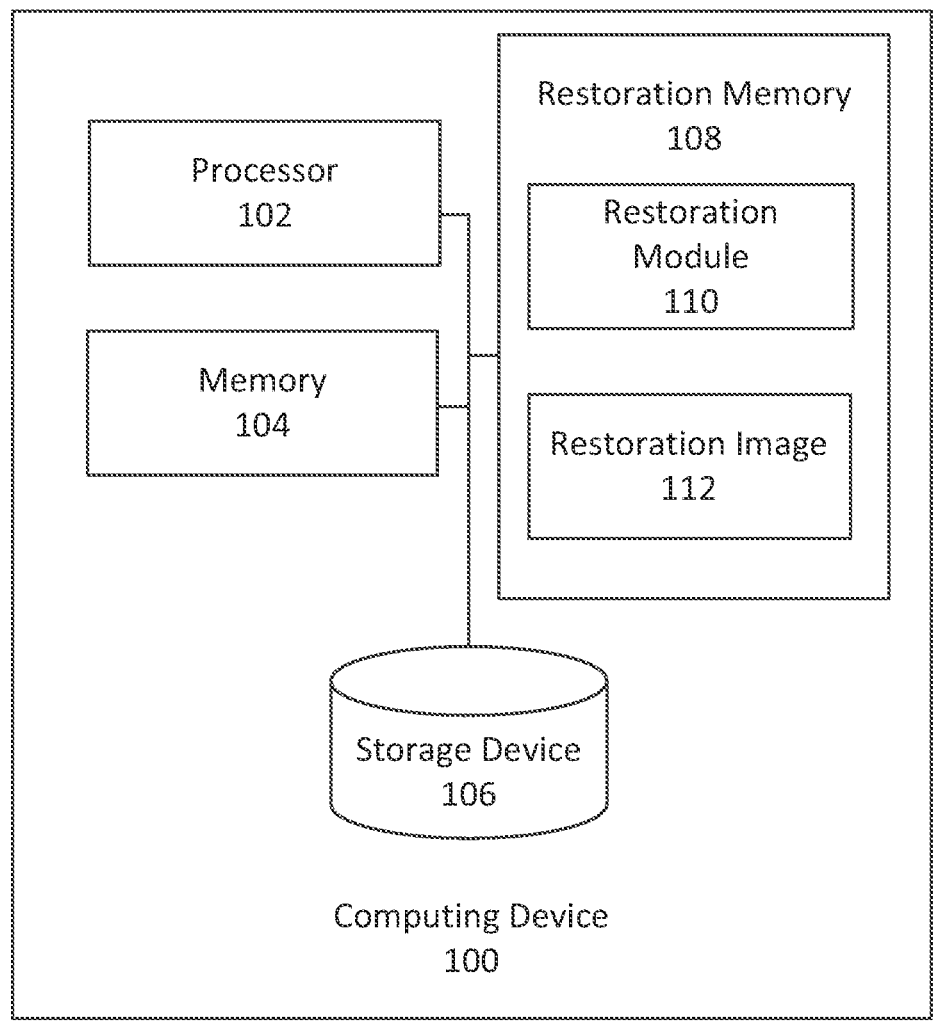
FIG. 1 illustrates a computing device having an embedded restoration memory according to examples of the present disclosure.

FIG. 1 illustrates a computing device 100 having an embedded restoration memory 108 according to examples of the present disclosure. The computing device 100 may include a processor 102, a memory 104, a storage device 106, and the restoration memory 108. The restoration memory 108 may further include a restoration module 110 and a restoration image 112. It should be understood that the computing device 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The processor 102 may be configured to process instructions for execution by the computing system 100. The instructions may be stored on a non-transitory tangible computer-readable storage medium, such as in the memory 104 or on a separate device (not shown), or on any other type of volatile or non-volatile memory that stores instructions to cause a programmable processor to perform the techniques described herein. Alternatively or additionally, the example computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The data store 106 of the example computing system 100 may contain user data and/or a user operating system. In one example, the data store 106 may be a hard disk drive or a collection of hard disk drives (or other similar type of storage medium). The data store 106 may be included in the example computing system 100 as shown, or, in another example, the data store 106 may be remote from and communicatively coupled to the computing system 100 such as via a network. The data store 106 may also be a collection of multiple data stores. In one example, the data store 106 may be an entire data store server or a collection of data store servers configured to store large amounts of data.

The restoration memory 108 may be a dedicated memory for storing a restoration module 110 and a restoration image 112 that can be used to restore a computing device's 100 operating system to its factory state. For example, the computing device 100 may include a user operating system installed at the factory on data store 106. The user operating system may be, for example, Microsoft Windows, Linux, Unix, Android, iOS, or any other appropriate user operating system variant.

The restoration image 112 of restoration memory 108 may include a copy of the user operating system installed on data store 106. This copy is referred to as the restoration image 112 (or the restoration operating system). In one example, although the user may interact with the user operating system installed on data store 106, the user may not access or interact with the restoration operating system stored in the restoration memory 108. Similarly, the user operating system may not access or interact with the restoration operating system stored in the restoration memory 108.

When a user is ready to restore the computing device 100, the user may trigger or initiate the restoration process in one or more ways. For example, the user may press a dedicated, separate button on the computing device 100. In this example, the computing device 100 may begin the restoration process at a very low level, which may be beneficial if the boot record or BIOS is damaged or corrupted or if the computing device cannot otherwise boot properly. In another example, the user may press another button, such as the power button, in a specific way, such as for a certain amount of times, for a certain number of times, in a certain sequence, or at a certain time. In yet another example, the user may select the restoration process during normal boot procedures using a keystroke on a keyboard, a touch on a touch screen, or another button press. A user may also initiate the restoration process from a BIOS setup menu. The trigger method may be device dependent such that one method may be useful on one type of device, while another method may be useful on another type of device.

Once triggered, the restoration module 110 of the restoration memory 108 may load a software kernel into memory 104 of the computing device 100. In this example, the software kernel may be store in the restoration memory 108 embedded in the computing device 100. The restoration module 110 may then load a pre-operating system environment into the memory 104. The restoration module 110 may also load a restoration script for restoring a user operating system which then installs a recovery operating system stored on the restoration memory 108 embedded in the computing device 110. Additional processes also may be included and are further discussed below regarding FIG. 3.

In one example, the restoration memory 108 may be device-independent such that it may be a device-agnostic solution used in a variety of devices, including for example smartphones, tablets, desktops, laptops, workstations, servers, smart monitors, smart televisions, digital signage, scientific instruments, retail point of sale devices, video walls, imaging devices, peripherals, or the like. In this way, a single design may be used across multiple platforms.

Figure 2:
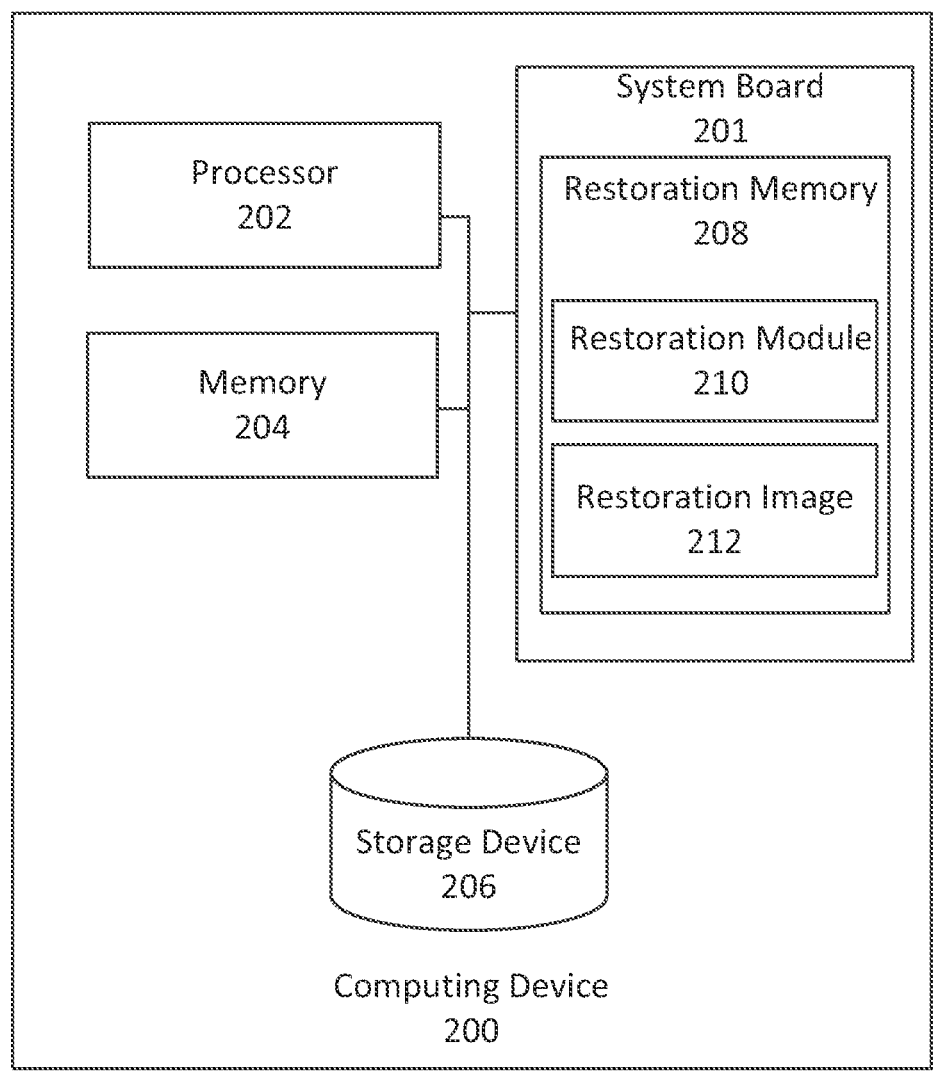
FIG. 2 illustrates a computing device having an embedded restoration memory according to examples of the present disclosure.

FIG. 2 illustrates a computing device 200 having an embedded restoration memory 208 according to examples of the present disclosure.

The computing device 200 may include a system board 201 communicatively coupled to a processor 202 for executing instructions, a memory 204 for storing the instructions, and a storage device 206 having a user operating system. The computing device 200 may also include a restoration memory 208 embedded to the system board 201 of the computing device 200, and the restoration memory 208 may include a restoration module 210 and a restoration image 212.

In one example, the restoration image 210 may exist independently of the user operating system on storage device 206. Additionally, the restoration image 212 may be inaccessible to the user operating system. In another example, the restoration module 210 may cause the computing device 200 to install the restoration image 212 from the restoration memory 208 onto the storage device 206 upon the occurrence of a trigger event, as described herein. In effect, installing the restoration image 212 onto the storage device 206 removes or deletes, either permanently or temporarily, the user operating system from the storage device 206. Alternatively, instead of removing or deleting the user operating system, installing the restoration image 212 onto the storage device 206 may cause the user operating system to be inactive without deleting it such that a user may later retrieve files from the user operating system after the restoration image 212 is installed onto the storage device 206.

In one example, the restoration memory 208 may be embedded into or onto the system board 201, such as a mother board or other integrated circuit board. In one embodiment, the restoration memory 208 may be a separate memory module connected to the system board 201 or another similarly device. This alleviates the need for a separate restoration media, such as a CD-ROM, or for a separate restoration partition to be installed on the user operating system of storage device 206. Separating the restoration memory 208 from the user operating system also prevents possible corruption of the restoration image 212 by the user operating system by making the restoration image 212 inaccessible to the user operating system.

Figure 3:
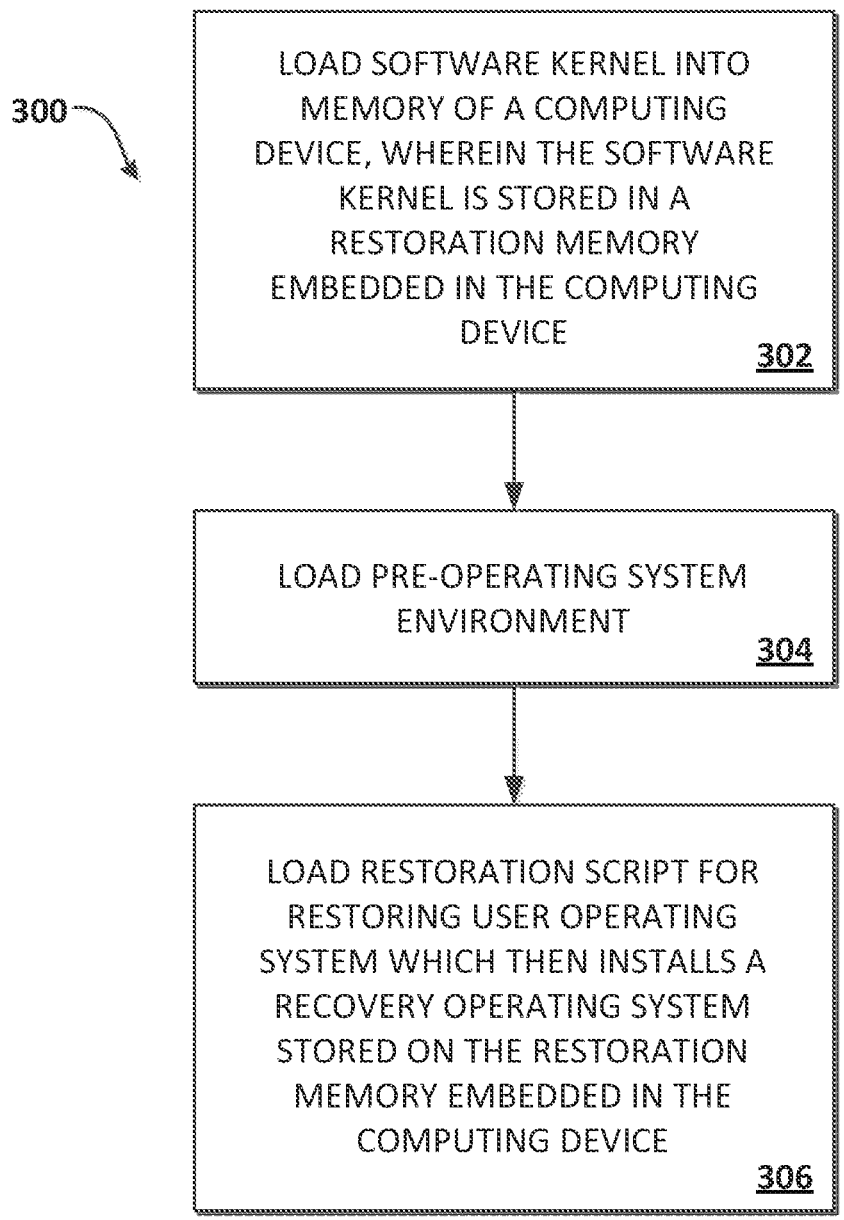
FIG. 3 illustrates a method for restoring a user operating system from an embedded restoration memory on a computing device according to examples of the present disclosure.

FIG. 3 illustrates a method 300 for restoring a user operating system from an embedded restoration memory on a computing device according to examples of the present disclosure. The method may be performed, for example, by the computing devices 100 and 200 shown in FIGS. 1 and 2 respectively, or by another similarly suited device.

The method 300 may include: loading a software kernel into a memory of a computing device, wherein the software kernel is stored in a restoration memory embedded in the computing device (block 302); loading a pre-operating system environment (block 304); and loading a restoration script for restoring a user operating system which then installs a recovery operating system stored on the restoration memory embedded in the computing device (block 306). Additional processes also may be included, and it should be understood that the processes depicted in FIG. 3 represent generalized illustrations, and that other processes may be added or existing processes may be removed, modified, or rearranged without departing from the scope and spirit of the present disclosure.

At block 302 a computing device may load a software kernel into a memory of the computing device, wherein the software kernel is stored in a restoration memory embedded in the computing device. Loading the software kernel may happen in response a trigger event, such as a user pressing a button on the computing device, pressing a certain key or keys on a keyboard, selecting to begin the restoration process on a menu, or in other ways, as described above. In one example, the software kernel may be stored in a restoration memory embedded into the computing device. In another example, the memory in the computing device is separate from the restoration memory in the computing device. The software kernel may be, for example, a Linux- or Unix-based software kernel.

In this way, the method 300 may be initiated at the lowest possible level, such as from the BIOS, a universal boot loader, or a proprietary boot loader in order to bypass and remove dependency on corrupt boot and system devices.

At block 304 the computing device may load a pre-operating system environment for restoring the user operating system on the computing device from the restoration memory embedded in the computing device into the memory of the computing device. In one example, the pre-operating system may enable a user to select a restoration image from the restoration memory embedded in the computing device, or the restoration image may be selected automatically in another example. The pre-operating system may also enable the user to begin installing the restoration image from the restoration memory embedded in the computing device onto a disk drive or other storage device of the computing device. In another example, the installation of the restoration image may occur automatically without user selection.

At block 306, the computing device may load a restoration script for restoring a user operating system which then installs a recovery operating system stored on the restoration memory embedded in the computing device. The restoration script effectively installs the recovery operating system over the user operating system, essentially returning the computing device to a factory state. In one example, the user operating system may be permanently or temporarily deleted. In another example, the user operating system may be kept so that a user may later attempt to recover any necessary files from the newly installed operating system.

In another example, method 300 may include recording and storing a digital image of the user operating system to the restoration memory embedded in the computing device. In this way, the image of the user operating system may be backed up for archival, cloning, or analysis.

It should be emphasized that the above-described embodiments are merely possible examples of implementations, set forth for a clear understanding of the principles of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A system comprising:
   a processor to execute instructions;
   a memory to store instructions;
   a storage device having a user operating system; and
   a restoration memory that is device-agnostic, is for embedding in a computing device, is separate from the storage device, and includes a restoration module and a restoration image,
   wherein the restoration image exists independently of the user operating system and is inaccessible to the user operating system and wherein the restoration module causes the computing device to install the restoration imagine from the restoration memory onto the storage device upon an occurrence of a trigger event by inactivating the user operating system without deleting the user operating system.

2. The system of claim 1, wherein installing the restoration image from the restoration memory onto the storage device further comprises:
   loading a software kernel from the restoration memory into the memory;
   loading a pre-operating system environment; and
   loading a restoration script for restoring the user operating system which then installs the restoration image stored on the restoration memory embedded in the computing device.

3. The system of claim 2, wherein the software kernel is stored in the restoration memory embedded in the computing device.

4. The system of claim 2, wherein the loading a software kernel from the restoration memory into the memory is performed by a proprietary boot loader to bypass dependency on corrupt boot and system devices.

5. The system of claim 1, wherein the trigger event is caused by a user initiation.

6. The system of claim 5, wherein the user initiation comprises the user pressing a designated button in a particular manner.

7. The system of claim 1, wherein the restoration image is a factory-installed version of the user operating system.

8. The system of claim 1, wherein the restoration memory is a single design for use across multiple platforms.

9. A method comprising:
   in response to receiving a request to initiate, a restoration of a user operating system on a computing device, loading, by the computing device, a software kernel into a memory of the computing device, wherein the software kernel is stored in a restoration memory embedded in the computing device, and wherein the restoration memory is device-agnostic, is separate from the memory of the computing device, and is separate from a storage device on which the user operating system is stored, wherein the loading a software kernel into the memory of the computing device is performed by a proprietary boot loader to bypass dependency on corrupt boot and system devices;
   loading, by the software kernel on the computing device, a pre-operating system environment for restoring the user operating system on the computing device from the restoration memory embedded in the computing device into the memory; and
   loading, by the pre-operating system environment on the computing device, a restoration script for restoring the user operating system on the computing device which then installs on the computing device a recovery operating system stored on the restoration memory embedded in the computing device.

10. The method of claim 9, wherein the pre-operating system environment includes a user interface enabling a user to select the recovery operating system.

11. The method of claim 9, wherein receiving a request to initiate a restoration of a user operating system on it computing device further comprises receiving an input from a user to initiate the restoration of the user operating system On the computing device.

12. The method of claim 11, further comprising:
   recording and storing, by a backup script, a digital image of the user operating system to the restoration memory embedded in the computing device.

13. The method of claim 12, wherein the backup script is loaded by the pre-operating system environment.

14. A computing device comprising:
   a system board communicatively coupled to a processor that executes instructions, a memory to store the instructions, and a storage device having a user operating system; and
   a restoration memory embedded to the system board of the computing device and having a restoration module and a restoration image, the restoration memory being device-agnostic,
   wherein the system board is separate from the processor and from the storage device,
   wherein the restoration image exists independently of the user operating system and is: inaccessible to the user operating system, and
   wherein the restoration module causes the computing device to install the restoration image from the restoration memory onto the storage device upon an occurrence of a trigger event by inactivating the user operating system without deleting the user operating system.

15. The computing device of claim 14, wherein the computing device is to install the restoration image from the restoration memory onto the storage device by:
   loading a software kernel from the restoration memory into the memory of the computing device;

loading a pre operating system environment; and
loading a restoration script for restoring the user operating system which then installs the restoration image stored on the restoration memory embedded in the computing device.

* * * * *

UNITED STATES PATENT AND TRADEMARK OFFICE
CERTIFICATE OF CORRECTION

PATENT NO. : 9,218,253 B2  
APPLICATION NO. : 13/905455  
DATED : December 22, 2015  
INVENTOR(S) : Anthony M. DiMarzio Page 1 of 1

It is certified that error appears in the above-identified patent and that said Letters Patent is hereby corrected as shown below:

Claims

In column 5, line 42, in Claim 1, delete "imagine" and insert -- image --, therefor.

In column 6, line 6, in Claim 9, delete "initiate," and insert -- initiate --, therefor.

In column 6, line 34, in Claim 11, delete "on it" and insert -- on a --, therefor.

In column 6, line 36, in Claim 11, delete "On" and insert -- on --, therefor.

In column 6, line 56, in Claim 14, delete "is:" and insert -- is --, therefor.

Signed and Sealed this  
Twenty-eighth Day of June, 2016

Michelle K. Lee  
*Director of the United States Patent and Trademark Office*